US011909110B2

(12) United States Patent
Aston et al.

(10) Patent No.: US 11,909,110 B2
(45) Date of Patent: Feb. 20, 2024

(54) ADDITIVELY MANUFACTURED MESH HORN ANTENNA

(71) Applicant: The Boeing Company, Chicago, IL (US)

(72) Inventors: Richard W. Aston, Brea, CA (US); Rachel Elizabeth Zilz, Redondo Beach, CA (US); Nicole Marie Hastings, Hermosa Beach, CA (US); Jessica Ann Buehler, Gardena, CA (US)

(73) Assignee: The Boeing Company, Arlington, VA (US)

( * ) Notice: Subject to any disclaimer, the term of this patent is extended or adjusted under 35 U.S.C. 154(b) by 148 days.

(21) Appl. No.: 17/382,288

(22) Filed: Jul. 21, 2021

(65) Prior Publication Data

US 2022/0140487 A1 May 5, 2022

Related U.S. Application Data

(60) Provisional application No. 63/085,951, filed on Sep. 30, 2020.

(51) Int. Cl.
*H01Q 13/02* (2006.01)
*B33Y 50/00* (2015.01)
(Continued)

(52) U.S. Cl.
CPC ......... *H01Q 13/0283* (2013.01); *B22F 10/80* (2021.01); *B33Y 50/00* (2014.12); *B33Y 80/00* (2014.12); *H01Q 21/061* (2013.01)

(58) Field of Classification Search
CPC .. H01Q 13/0283; H01Q 21/061; B33Y 80/00; B33Y 50/00; B22F 10/80
See application file for complete search history.

(56) References Cited

U.S. PATENT DOCUMENTS 2,478,913 A * 8/1949 Goldberg ............... H01Q 19/13
343/820
3,597,710 A * 8/1971 Levy ....................... H01P 1/211
333/210
(Continued)

FOREIGN PATENT DOCUMENTS

CN 102361116 A 2/2012
CN 106159453 A * 11/2016 ......... H01Q 13/0275
(Continued)

OTHER PUBLICATIONS

U.S. Patent and Trademark Office, Final Office Action regarding U.S. Appl. No. 16/422,949, dated Sep. 16, 2021, 27 pages.
(Continued)

*Primary Examiner* — Dimary S Lopez Cruz
*Assistant Examiner* — Jordan E. DeWitt
(74) *Attorney, Agent, or Firm* — Kolisch Hartwell, P.C.

(57) ABSTRACT

An antenna device is disclosed, including an additively manufactured tubular body portion having a wall portion with a plurality of holes. The tubular body portion is configured to transmit electromagnetic radiation in a selected operating frequency range, and to have a mass below a maximum mass threshold. The plurality of holes reduce the mass of the tubular body below the maximum mass threshold without significantly adversely affecting electromagnetic radiation transmission capability of the tubular body in the selected operating frequency range.

20 Claims, 5 Drawing Sheets

(51) Int. Cl.
*B33Y 80/00* (2015.01)
*B22F 10/80* (2021.01)
*H01Q 21/06* (2006.01)

(56) References Cited

U.S. PATENT DOCUMENTS

| | | | | |
|---|---|---|---|---|
| 4,122,446 | A * | 10/1978 | Hansen | H01Q 13/025 |
| | | | | 343/786 |
| 4,668,956 | A * | 5/1987 | Mahnad | H01Q 13/18 |
| | | | | 343/789 |
| RE32,485 | E * | 8/1987 | Yang | H01Q 13/065 |
| | | | | 343/786 |
| 5,182,849 | A * | 2/1993 | Marco | H01P 11/002 |
| | | | | 29/600 |
| 5,342,465 | A * | 8/1994 | Bronowicki | F16F 9/30 |
| | | | | 156/190 |
| 6,208,310 | B1 | 3/2001 | Suleiman et al. | |
| 6,323,819 | B1 * | 11/2001 | Ergene | H01Q 13/0241 |
| | | | | 343/786 |
| 9,496,621 | B2 * | 11/2016 | Meschini | H01Q 1/288 |
| 9,608,333 | B1 * | 3/2017 | Toledo | H01Q 1/10 |
| 9,742,069 | B1 * | 8/2017 | Hollenbeck | H01Q 13/0208 |
| 10,355,359 | B1 * | 7/2019 | Butscher | H01Q 5/55 |
| 10,392,135 | B2 * | 8/2019 | Smith | F28F 1/16 |
| 10,407,189 | B1 * | 9/2019 | Freestone | B64G 1/10 |
| 10,589,878 | B2 | 3/2020 | Veto et al. | |
| 10,751,988 | B1 * | 8/2020 | Snyder | B29D 11/00875 |
| 2002/0135528 | A1 * | 9/2002 | Teillet | H01Q 21/26 |
| | | | | 343/797 |
| 2005/0099352 | A1 * | 5/2005 | Killen | H01Q 15/0013 |
| | | | | 343/909 |
| 2006/0185277 | A1 * | 8/2006 | Quincieu | B64G 1/10 |
| | | | | 52/265 |
| 2010/0065192 | A1 * | 3/2010 | Wilson | G06F 3/042 |
| | | | | 156/180 |
| 2011/0279339 | A1 * | 11/2011 | Johnston | H01Q 13/02 |
| | | | | 343/786 |
| 2012/0044119 | A1 * | 2/2012 | Libonati | H01Q 9/28 |
| | | | | 29/601 |
| 2013/0214980 | A1 * | 8/2013 | Lambert | H01Q 13/085 |
| | | | | 343/771 |
| 2015/0048209 | A1 * | 2/2015 | Hoyt | B64G 1/58 |
| | | | | 264/308 |
| 2016/0067740 | A1 * | 3/2016 | Voris | B33Y 10/00 |
| | | | | 425/150 |
| 2016/0107380 | A1 * | 4/2016 | Smoot | B29C 64/124 |
| | | | | 264/401 |
| 2016/0167312 | A1 * | 6/2016 | Feinberg | A61L 27/18 |
| | | | | 264/239 |
| 2016/0301430 | A1 * | 10/2016 | Mohamadi | B33Y 80/00 |
| 2017/0036783 | A1 * | 2/2017 | Snyder | B23K 9/044 |
| 2017/0062925 | A1 * | 3/2017 | Sanchez | H01Q 1/50 |
| 2017/0159447 | A1 * | 6/2017 | Clum | F23R 3/002 |
| 2017/0252804 | A1 * | 9/2017 | Hanni | B33Y 70/00 |
| 2017/0256848 | A1 * | 9/2017 | McGrath | H01Q 21/0075 |
| 2017/0263991 | A1 * | 9/2017 | Jensen | H01P 1/173 |
| 2017/0361534 | A1 * | 12/2017 | Fernandez-Nieves | |
| | | | | B29C 64/40 |
| 2018/0021140 | A1 * | 1/2018 | Angelini | C12N 5/0062 |
| | | | | 623/23.72 |
| 2018/0083350 | A1 * | 3/2018 | Lam | H01P 1/2005 |
| 2018/0087443 | A1 * | 3/2018 | Adriany | F28D 7/163 |
| 2018/0184550 | A1 * | 6/2018 | Jenkins | H05K 3/10 |
| 2018/0229863 | A1 | 8/2018 | Veto et al. | |
| 2018/0258382 | A1 * | 9/2018 | Keselowsky | C12M 3/00 |
| 2018/0281339 | A1 * | 10/2018 | Hull | B32B 9/005 |
| 2018/0311733 | A1 * | 11/2018 | Zafar | B23K 26/702 |
| 2018/0366801 | A1 * | 12/2018 | Jensen | H01P 1/173 |
| 2019/0173193 | A1 * | 6/2019 | Tomasic | H01Q 3/40 |
| 2019/0291186 | A1 * | 9/2019 | Aston | H01Q 9/16 |
| 2019/0315501 | A1 * | 10/2019 | Duong | B64G 1/503 |
| 2020/0112107 | A1 * | 4/2020 | Taptic | H01Q 15/24 |
| 2020/0161738 | A1 * | 5/2020 | de Rijk | H01P 3/12 |
| 2020/0176841 | A1 * | 6/2020 | Ayoub | H01P 1/171 |
| 2020/0289288 | A1 * | 9/2020 | Müller | B33Y 80/00 |
| 2020/0373642 | A1 * | 11/2020 | Aston | H01P 1/211 |
| 2020/0373657 | A1 * | 11/2020 | Aston | H01Q 19/108 |
| 2021/0354856 | A1 * | 11/2021 | Aston | B64G 1/228 |
| 2021/0354859 | A1 * | 11/2021 | Aston | B64G 1/1007 |
| 2021/0356015 | A1 * | 11/2021 | Aston | B64G 1/641 |
| 2021/0408655 | A1 * | 12/2021 | Prabhu Gaunkar | H01P 1/2002 |

FOREIGN PATENT DOCUMENTS

| | | | | |
|---|---|---|---|---|
| CN | 208392799 | U | | 1/2019 |
| CN | 208507922 | U | | 2/2019 |
| CN | 113540806 | A * | 10/2021 | |
| EP | 557853 | A1 | | 9/1993 |
| EP | 1367672 | A1 | | 12/2003 |
| EP | 3333474 | A1 | | 10/2017 |
| EP | 3333474 | A1 * | 6/2018 | B33Y 80/00 |
| EP | 3544118 | A1 * | 9/2019 | B22F 5/106 |
| EP | 3742556 | A1 | | 11/2020 |
| EP | 3785828 | A1 | | 3/2021 |
| EP | 3979419 | A1 * | 4/2022 | B22F 10/80 |
| JP | H05175726 | A | | 7/1993 |
| JP | 2001044742 | A | | 2/2001 |
| JP | 2015-093461 | A | | 5/2015 |
| JP | 2015-525290 | A | | 9/2015 |
| JP | 6301025 | B1 * | 3/2018 | H01P 1/161 |
| KR | 1020190044527 | A | | 4/2019 |
| WO | 2011017198 | A2 | | 2/2011 |
| WO | 2012076994 | A1 | | 6/2012 |
| WO | 2013179017 | A1 | | 12/2013 |
| WO | 2017169080 | A1 | | 10/2017 |

OTHER PUBLICATIONS

Japan Patent Office, Notification of Reasons for Rejection for Japanese Patent Application No. 2019-041151, dated Jan. 17, 2023, 6 pages.
U.S. Patent and Trademark Office, Non-Final Office Action regarding U.S. Appl. No. 16/422,949, Jan. 25, 2022, 8 pages.
European Patent Office, Extended European Search Report regarding European Patent Application No. 21168773.6, dated Oct. 19, 2021, 9 pages.
European Patent Office, Extended European Search Report regarding European Patent Application No. 21168768.6, dated Oct. 19, 2021, 11 pages.
European Patent Office, Examination Report regarding European Patent Application No. 20170572.0, dated Jun. 17, 2022, 8 pages.
U.S. Patent and Trademark Office, Non-Final Office Action regarding U.S. Appl. No. 17/393,342, dated Oct. 31, 2022, 39 pages.
European Patent Office, Examination Report regarding European Patent Application No. 19164587.8, dated Feb. 2, 2022, 6 pages.
Huang, Guan-Long et al., "3-D Metal-Direct-Printed Wideband and High-Efficiency Waveguide-Fed Antenna Array", The Institute of Electrical and Electronics Engineers, Inc. (IEEE) Conference Proceedings, May 1, 2015, 1 page.
Lap, Bram, "Design of a Pickett-Potter Horn to measure the CMB at 11 GHz", Kapteyn Astronomical Institute and SRON, Netherlands Institute for Space Research, Jul. 6, 2015, 72 pages.
Saucourt, Jeremy et al., "Design of 3D printed plastic modular filters", 2016 46th European Microwave Conference (EUMC), European Microwave Association, Oct. 4, 2016, pp. 369-372.
Bahr, Ryan A. et al., "Novel Uniquely 3D Printed Intricate Voronoi and Fractal 3D Antennas", IEEE, 2017, pp. 1583-1586.
Wang et al., "A Wideband Millimeter-Wave Circularly Polarized Antenna With 3-D Printed Polarizer", IEEE Transactions on Antennas and Propagation, vol. 65, No. 3, Mar. 1, 2017, pp. 1038-1046.
Kaddour, Abdul Sattar et al., "3D Printed Compact Dual-Polarized Wideband Antenna", 2017 11th European Conference on Antennas and Propagation (EUCAP), EURAAP Mar. 19, 2017, pp. 3441-3443.
Peverini, Oscar A. et al., "Selective Laser Melting Manufacturing of Microwave Waveguide Devices", Proceedings of the IEEE, IEEE, New York, US, vol. 105, No. 4, Apr. 1, 2017, pp. 620-631.

(56) References Cited

OTHER PUBLICATIONS

Talom, F. Tchoffo et al., "Additive manufacturing form RF microwave devices: Design, performances and treatments improvement evaluations", 2017 International Conference on Electromagnetics in Advanced Applications (ICEAA), IEEE, Sep. 11, 2017, pp. 1473-1476.

Booth, Paul A. et al., "Realizing advanced waveguide bandpass filters using additive manufacturing", IET Microwaves, Antennas & Propagation, The Institution of Engineering and Technology, United Kingdom, vol. 11, No. 14, Nov. 19, 2017, pp. 1943-1948.

Peverini, Oscar A. et al., "Additive manufacturing of Ku/K-band waveguide filters: a comparative analysis among selective-lithography" IET Microwaves, Antennas & Propagation, vol. 11, No. 14, Nov. 19, 2017, pp. 1936-1942.

Hindle, Pat, "Antenna Technologies for the Future", Microwave Journal, Jan. 15, 2018, Retrieved from the Internet: URL: https://www.microwavejournal.com/articles/print/29572-antenna-technologies-for-the-future, retrieved on Jul. 27, 2020, 9 pages.

Bjorgaard, Jason et al., "Design and Fabrication of Antennas Using 3D Printing", Progress In Electromagnetics Research C, 2018, vol. 84, pp. 119-134.

Salak, Milan et al., "W-Band Waveguide Bandpass Filters Fabricated by Micro Laser Sintering", IEEE Transactions on Circuits and Systems II: Express Briefs, IEEE, US, vol. 66, No. 1, Jan. 1, 2019, pp. 61-65.

European Patent Office, Extended European Search Report regarding European Patent Application No. 19164587.8, dated Aug. 6, 2019, 10 pages.

U.S. Patent and Trademark Office, Non-Final Office Action regarding U.S. Appl. No. 15/933,289, dated Dec. 5, 2019, 12 pages.

U.S. Patent and Trademark Office, Final Office Action regarding U.S. Appl. No. 15/933,289, dated May 15, 2020, 9 pages.

European Patent Office, Examination Report regarding European Patent Application No. 19164587.8, dated Aug. 5, 2020, 8 pages.

U.S. Patent and Trademark Office, Non-Final Office Action regarding U.S. Appl. No. 15/933,289, dated Sep. 14, 2020, 11 pages.

European Patent Office, Extended European Search Report regarding European Patent Application No. 20164010.9, dated Sep. 18, 2020, 12 pages.

European Patent Office, Extended European Search Report regarding European Patent Application No. 20170572.0 dated Oct. 28, 2020, 7 pages.

European Patent Office, Examination Report regarding European Patent Application No. 19164587.8, dated Mar. 5, 2021, 7 pages.

U.S. Patent and Trademark Office, Non-Final Office Action regarding U.S. Appl. No. 16/422,939 dated Mar. 15, 2021, 25 pages.

U.S. Patent and Trademark Office, Non-Final Office Action regarding U.S. Appl. No. 16/422,949, dated Apr. 9, 2021, 31 pages.

Huang, Guan-Long et al., "Lightweight Perforated Waveguide Structure Realized by 3-D Printing for RF Applications", IEEE Transaction on Antennas and Propagation, IEEE, USA, vol. 65, No. 8, Aug. 1, 2017, pp. 3897-3904.

European Patent Office, Extended European Search Report regarding European Patent Application No. 21199091.6, dated Feb. 10, 2022, 9 pages.

Japan Patent Office, Office Action for Japanese Patent Application No. 2019-041151, dated May 16, 2023, 4 pages.

* cited by examiner

ADDITIVELY MANUFACTURED MESH HORN ANTENNA

CROSS-REFERENCES

This application claims the benefit under 35 U.S.C. § 119(e) of the priority of U.S. Provisional Patent Application Ser. No. 63/085,951, filed Sep. 30, 2020, the entirety of which is hereby incorporated by reference for all purposes.

BACKGROUND

Antennas are a key element of radio communications technology, for transmitting and/or receiving radio signals. The conductive material of an antenna serves as an interface between electric currents in a communicator circuit and radiated electromagnetic waves. Geometry and material of the antenna determine properties such as impedance, directionality, and bandwidth. Preferable properties depend on the intended location and application of the antenna, which may vary widely. For example, consumer frequency modulation (FM) radios may use a monopole omnidirectional antenna appropriate to receiving signals from any direction, whereas Global Positioning System (GPS) satellites may use a highly directional antenna for earth directed transmission. For many applications, complex geometry must be executed with high precision to produce an effective antenna. Such antennas are conventionally manufactured by hand assembly of multiple individually machined parts, a slow and expensive process.

Additive Manufacturing (AM) is quickly gaining popularity in many industries as a method of rapid production at relatively low cost. AM, sometimes known as 3D printing, can be used to create a solid object from a 3D model by building the object incrementally. AM typically applies a raw material that is then selectively joined or fused to create the desired object. The raw material is typically applied in layers, where the thickness of the individual layers can depend upon the particular techniques used.

Often, the raw material is in the form of granules or powder, applied as a layer and then selectively fused by a heat source. In many cases, the upper surface of a bed of such material is fused, and the growing workpiece is then lowered slightly. A fresh layer of raw material is then applied to the bed, and the next layer is fused onto the previous one. The granular raw material may include for example thermoplastic polymer, metal powder, metal alloy powder, or ceramic powder, which may be fused using a computer-controlled heat source, such as a scanning laser or scanning electron beam. Exemplary methods include selective laser melting (SLM), direct metal laser sintering (DMLS), selective laser sintering (SLS), fused deposition modelling (FDM), and electron beam melting (EBM), among others.

Conventional part designs used for machining or other subtractive manufacturing may be inefficient or even unworkable for AM. Depending on the process and material used, unsupported features may collapse, delicate features may be rendered with insufficient clarity, and/or warping and cracking may occur. New designs maintaining functionality of conventional parts while enabling efficient use of AM methods are needed.

SUMMARY

The present disclosure provides systems, apparatus, and methods relating to additively manufactured antenna devices. In some examples, an antenna device may include an additively manufactured tubular body portion having a wall portion with a plurality of holes. The tubular body portion may be configured to transmit electromagnetic radiation in a selected operating frequency range, and to have a mass below a maximum mass threshold. The plurality of holes may reduce the mass of the tubular body below the maximum mass threshold without significantly adversely affecting electromagnetic radiation transmission capability of the tubular body in the selected operating frequency range.

In some examples, an antenna device may include and additively manufactured tubular body portion having a plurality of holes. The antenna device may have an operating frequency range, and the plurality of holes may be sized and arranged such that the plurality of holes are effectively opaque in the operating frequency range.

In some examples, a method of additively manufacturing an antenna may include receiving a design for a traditionally manufactured antenna and identifying portions of the design with are less than a minimum printable size of a selected additive manufacturing apparatus. The method may further include modifying the design, including increasing the size of the identified portions and inserting a plurality of holes. The method may further include additively manufacturing an antenna according to the modified design.

Features, functions, and advantages may be achieved independently in various examples of the present disclosure, or may be combined in yet other examples, further details of which can be seen with reference to the following description and drawings.

DETAILED DESCRIPTION

Various aspects and examples of an additively manufactured mesh antenna device, as well as related methods, are described below and illustrated in the associated drawings. Unless otherwise specified, an antenna device in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through C, each of which is labeled accordingly.

Overview

In general, an antenna device may include an additively manufactured structure comprising a conductive material. An antenna device may also be referred to as an antenna component. The antenna device may be configured to facilitate sending and/or receiving radio signals, and may function as part of a conventional antenna such as a command horn, cup dipole, or waveguide antenna. The antenna device may additionally or alternatively function as an antenna without additional components.

Figure 1:
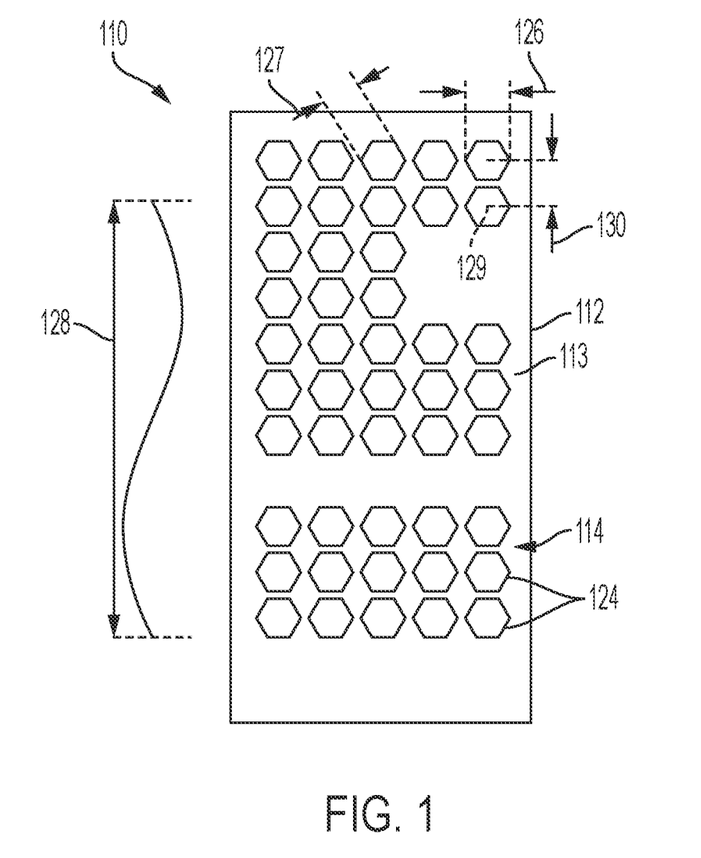
FIG. 1 is a schematic diagram of an illustrative antenna device in accordance with aspects of the present disclosure.

FIG. 1 is a schematic diagram of an antenna device indicated at 110, having a body portion 112 with a wall portion 113 and a plurality of mesh through holes 114. The body portion may be tubular, elongate, and/or hollow. The body portion may be configured to form a channel for transmitting or receiving radio frequency signals, and/or may be configured to direct electromagnetic radiation within an operating frequency range. For example, a satellite antenna may be configured to operate on radio frequencies, for example between approximately 8 and 18 Gigahertz.

Antenna device 110 may further include one or more internal structures having a geometry configured to facilitate transmission and/or reception of radio frequency electromagnetic waves. The structure or structures may be configured for a selected polarization, resonant frequency band, radiation pattern, and/or any functional antenna properties. Examples include, but are not limited to, a septum, an iris, a dipole, a tuning screw, a post filter, and/or any combination thereof. Wall portion 113 may also have an inner geometry configured for a selected polarization, resonant frequency band, radiation pattern, and/or any functional antenna properties.

Antenna device 110 includes a conductive material, which may be a laser sintered metal. In some examples, the component may include aluminum, copper, titanium, and/or an alloy thereof. The component may include multiple materials, or may be produced from a single material. Conductivity, elasticity, density, and temperature sensitivity, along with other factors, may be considered in selecting a material or combination of materials for antenna device 110. Appropriate or desirable materials may depend on an intended application of the antenna device, and a selected additive manufacturing method.

Antenna device 110 has a manufacturing orientation defined by a build axis, which may coincide with an elongate axis of body portion 112. The antenna device may comprise a plurality of layers, each layer being generally perpendicular to the build axis. Each layer may be thin and planar, and fused to or otherwise cohesive with adjacent layers.

Variation from one layer to an adjacent layer may be limited. That is, dimensions of antenna device 110 may change gradually along the build axis. The antenna device may include no abrupt overhangs, where an abrupt overhang may be described as any downward-facing surface forming an angle of greater than approximately 45 degrees or greater than approximately 50 degrees with the build axis. All features of antenna device 110 may therefore be printed without need for secondary supports.

In some examples, antenna device 110 may be post-processed from an additively manufactured blank. Horizontal holes, threading, and/or other features inappropriate to additive manufacture may be machined. In such examples, the additively manufactured blank may include no abrupt overhangs and may be printed without use of secondary supports.

Thickness of any structure of antenna device 110 may be limited by the additive manufacturing method and/or apparatus used to produce the component. More specifically, the thickness may have a lower limit. Structures below this limit may be inconsistent, may deviate from desired specifications, and/or may be subject to cracking during printing or subsequent cooling, for example.

Conventional antenna designs may include walls or other structures thinner than the effective manufacturing limit. Accordingly, such a design may be modified to permit additive manufacture. More specifically, any structures thinner than the effective manufacturing limit may be increased in thickness. However, such thickening may increase the overall mass of the antenna device. Increased mass may in turn increase material cost and print time, and may be particularly disadvantageous for antennas used on satellites or other spacecraft.

Plurality of holes 114 of antenna device 110 may partially or entirely balance out mass increases associated with necessary thickness increases. In other words, plurality of holes 114 may be configured to reduce the mass of antenna device 110 without significant effect on the functionality of the antenna device.

Needed alterations to a conventional design, including thickening and introduction of holes, may depend on the printing resolution limits associated with a specific selected additive manufacturing method and/or equipment. In some examples, antenna device 110 may be additively manufacturable according to a conventional design with little or no need for thickening of structures. In such examples, plurality of holes 114 may reduce the weight of antenna device 110 relative to a conventionally manufactured antenna device of corresponding design.

Holes 124 of plurality of holes 114 are depicted as arranged in a regular, repeating pattern, which may be described as forming an array. In general, holes 124 may be arranged in any appropriate regular or irregular pattern. Holes 124 may also be described as openings, circular apertures, and/or voids, and/or the material between the holes may be described as forming a mesh. Antenna device 110 may include a single continuous array of holes, multiple discrete arrays, and/or any effective groupings of holes 124. The holes may be uniform and identical, or may vary in size and/or shape.

Holes 124 may be sized and/or shaped to allow additive manufacture without use of secondary supports. In the depicted example, holes 124 are hexagonal but sufficiently small to allow printing without buckling. In some examples, the holes may have a self-supporting shape and orientation, such as a rectangle or a diamond having sides at an angle of no more than 45 degrees relative to the build axis.

Each hole 124 has a maximum dimension 126, and in some examples may have a minimum dimension 127. The maximum dimension may also be described as a greatest opening width of the hole, and the minimum dimensions may also be described as a smallest opening width of the hole. For the depicted hexagonal openings, maximum dimension 126 is between opposing corners and minimum dimension 127 is between opposing sides. For a circular opening the maximum dimension and minimum dimensions would both be a diameter of the circle. Maximum dimension 126 may be limited by manufacturability and/or electromagnetic effect. Minimum dimension 127 may be limited by manufacturability.

Minimum dimension 127 may be greater than a minimum printable hole size and maximum dimension 126 may be less than a maximum self-supporting size. These limits may be determined by the selected additive manufacturing process and apparatus, and selected hole shape and position. For example, the maximum self-supporting size for a diamond shaped opening may be significantly greater than the maximum self-supporting size for a circular opening. For another example, a printer having a smaller printed layer thickness may have a smaller minimum printable hole size.

Antenna device 110 may be configured for transmission and/or receipt of radio signals within a range of wavelengths. In other words, antenna device 110 may be configured to direct electromagnetic radiation within a selected frequency band. The antenna device may also be described as having an intended operating frequency range.

Maximum dimension 126 of each hole 124 may be limited relative to a smallest expected wavelength 128. An electromagnetic wave signal with wavelength 128 is schematically depicted in FIG. 1, not to scale. Limiting maximum dimension 126 may ensure that holes 124 have a negligible impact on the electromagnetic properties of antenna device 110. Holes 124 may be described as electromagnetically opaque to the intended operating frequency range of the antenna device.

For example, maximum dimension 126 may be less than ten percent of wavelength 128. In some examples, maximum dimension 126 may be selected such that the impact of holes 124 on operation of antenna device 110 is below a selected acceptable threshold. Smaller holes may have decreased impact, and holes 124 may be sized small enough relative to expected wavelength 128 to avoid affecting antenna performance. In some examples, the maximum dimension may be less than five percent, or less than 2 percent of the expected wavelength.

Holes 124 may also be sized, spaced and/or positioned according to structural requirements of antenna device 110. That is, holes 124 may be configured such that antenna device 110 has sufficient structural strength, stiffness, and/or other desired structural properties. For example, holes 124 may be spaced from joints, corners, and/or key structural features. For another example, holes 124 may comprise less than a selected percentage of wall portion 113 of the antenna device. For instance, holes 124 may comprise less than half a surface area of wall portion 113 of the antenna device, or the ratio of wall area to hole area may be greater than one.

Each hole 124 has a center 129, and spacing of the holes may be described in terms of a center-to-center distance 130. Distance 130, maximum dimension 126, and the shape of holes 124 may determine the surface are of wall portion 113 or other structure between holes of plurality of holes 114. In some examples, the shape of holes 124 may be selected to facilitate efficient packing of the holes, and reduce the wall surface area corresponding to a given center-to-center distance 130.

Figure 2A:
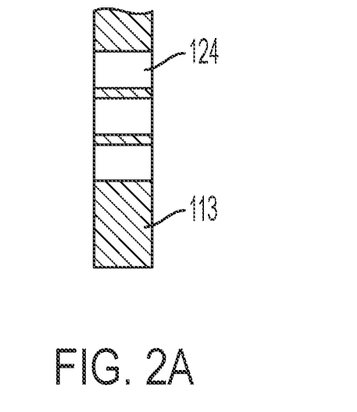
FIG. 2A is a schematic diagram of a first example of a cross-section of holes of the antenna device of FIG. 1.
Figure 2B:
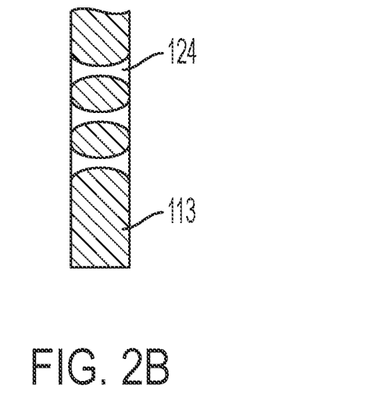
FIG. 2B is a schematic diagram of a second example of a cross-section of holes of the antenna device of FIG. 1.

As outlined above, plurality of holes 114 may be configured to reduce the mass of wall portion 113, and of antenna device 110 overall. Size, number, and/or spacing of holes 124 may selected to provide sufficient mass reduction. In some examples, an extent of the holes through wall portion 113 may also be configured for mass reduction. FIGS. 2A and 2B are schematic depictions of two illustrative cross-sectional shapes of holes 124, as taken along a plane perpendicular to wall portion 113.

FIG. 2A depicts a linear extent of holes 124, which may be appropriate for ease of printing, particularly in examples where minimum dimension 127 is close to the minimum printable hole size. FIG. 2B depicts a butterfly or yo-yo extent of holes 124, in which the holes have a greatest size at first and second sides of wall portion 113 and a smaller size interior to the wall portion. Such a configuration may allow additional mass reduction, while maintaining desired electromagnetic opacity of wall portion 113.

In some examples, antenna device 110 may further include a base portion configured for connection to an electronic circuit. For example, the antenna device may include apertures appropriate for attaching coaxial adapters. The antenna device may also be configured for connection to other antenna components, such as a reflector dish or dipole. In some examples, antenna device 110 may be designed to have an equivalent functionality as an existing antenna design and may be configured to connect to a generally matching electrical system as the existing antenna design.

Antenna device 110 may be partially or entirely unitary. In other words, body portion 112, any internal structure, any base portion, and/or any other portions of the antenna device may comprise a single structure. The antenna device may be additively manufactured in one process, without need for assembly of separate parts. The antenna device may also be manufactured without secondary supports that require removal after manufacture.

Antenna device 110 may have improved reliability, as a result of unitary construction. Failure modes related to connection or interaction of parts may be eliminated. For example, the antenna device may not include bolts that may loosen under vibration, shims that shift under load, or tuning screws that alter tuning during transportation. Generally, potential for operational complications may be reduced for an antenna comprising fewer components.

Examples, Components, and Alternatives

The following sections describe selected aspects of exemplary antenna devices as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Mesh Horn Antenna

As shown in FIGS. 3-6, this section describes an illustrative mesh horn antenna 210. Antenna 210 is an example of an antenna device as described above. The depicted additively manufactured antenna is designed as a functional replacement for a conventional, traditionally manufactured pyramidal horn antenna. The conventional antenna includes a plurality of separately machined components, each screwed, bonded, or otherwise fixed together. For example, a stepped septum configured for a circular polarization of the antenna is bonded inside of a separately manufactured hollow rectangular waveguide, which is in turn fixed to multiple separate horn sections.

Dimensions and positioning of each component of the conventional antenna are calculated to result in desired functional properties, such as polarization, resonant frequency, and directionality. However, some surfaces and structures are critical to the electromagnetic properties of the antenna, while others are structurally and mechanically important.

Additively manufactured antenna 210 is configured to retain the electromagnetically and functionally critical features of the conventional antenna, with alterations to structural and mechanically important features to enable additive manufacture. Antenna 210 may also be configured to interface with electronics used with the conventional antenna.

Figure 3:
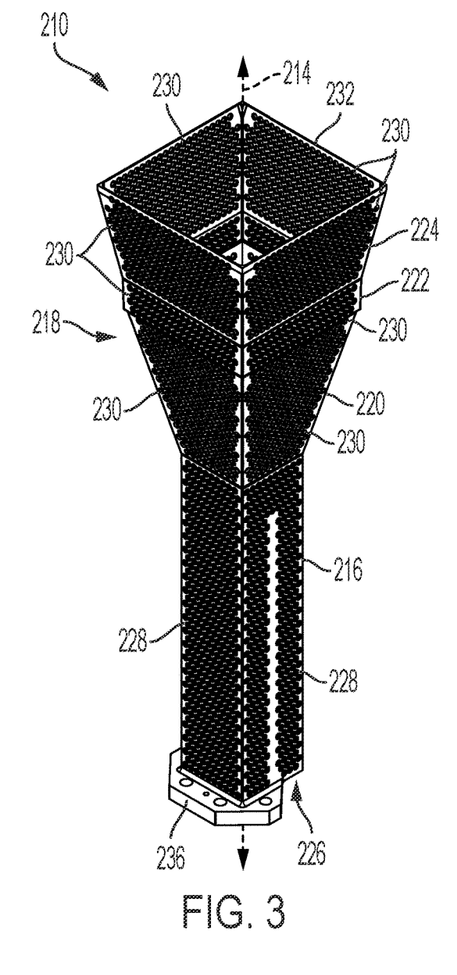
FIG. 3 is an isometric view of an illustrative mesh horn antenna as described herein.

As shown in FIG. 3, antenna 210 is unitary. That is, the antenna is a single piece and does not require assembly other than attaching a feed line such as a coaxial adapter. The single piece antenna may also have improved reliability and/or fewer failure modes. The antenna is configured for manufacture without secondary supports. In other words, no support structures need to be removed after manufacture of the antenna. The depicted example of antenna 210 requires minimal post-processing in the form of machining fastener apertures at a bottom end of the antenna, as described in greater detail below. The antenna may be configured such that surface roughness resulting from manufacture is limited sufficiently that overall surface finishing is not needed.

Antenna 210 may be configured for manufacture by Direct Metal Laser Sintering (DMLS). The antenna comprises a laser sintered aluminum alloy, specifically AlSi10Mg Type II, in the present example. The alloy may provide good strength, hardness, and high load tolerance, along with low weight. Any metal or alloy of similarly appropriate properties may be used, in any effective additive manufacturing process.

Antenna 210 has a central axis 214, which may be described as determining a manufacturing orientation of antenna 210 and/or as a build axis of the antenna. When the antenna is manufactured, central axis 214 may be parallel to a vertical or z-axis of the manufacturing equipment. Antenna 210 may consequently comprise a plurality of planar layers that are perpendicular to central axis 214.

As shown in FIG. 3, antenna 210 includes a rectangular waveguide portion 216 and a multi-section pyramidal horn portion 218. A rectangular cross-sectional shape 250 of each of portions 216, 218 may be seen more clearly in FIG. 6. Waveguide portion 216 and horn portion 218 may be described as forming a body portion of antenna 210, which is an example of body portion 112 as described above, and/or may each be described as an example of body portion 112. In the present example, horn 218 includes a taper section 220, a mode suppressor section 222, and a flare section 224. Antenna 210 may be described as a potter horn antenna, a command horn antenna, and/or a feed horn antenna.

Waveguide 216 may be described as a tube with an interior cavity 226, and consists of four planar walls 228 (e.g. wall portions) joined at four linear corners. Wall portions 228 are examples of wall portion 113 as described above. In the present example, the waveguide has a square cross-sectional shape and wall portions 228 are each of the same dimensions. Interior cavity 226 has constant cross-sectional dimensions along central axis 214. Waveguide 216 further includes an internal stepped septum 234, shown in FIGS. 4 and 5, which may be configured to circularly polarize a radio signal. The septum is a thin plate, extending across interior cavity 226 between two opposing wall portions 228.

Referring again to FIG. 3, horn 218 may also be described as consisting of multiple planar wall portion (e.g. wall sections) 230, and including an interior cavity 232. Wall portions 230 are also examples of wall portion 113 as described above. Each section 220, 222, 224 of the horn includes four wall portions 230. Some of planar wall portions 230 form an oblique angle relative to central axis 214, while others are parallel to the central axis. Interior cavity 232 of horn 218 is in communication with interior cavity 226 of waveguide 216, and wall portions 230 of taper section 220 of the horn are each connected to a respective one of wall portions 228.

In general, antenna 210 may include any structures and/or features included in a conventional antenna design and/or configured to produce equivalent electromagnetic functionality to the structures or features of the conventional antenna design. For example, antenna 210 may include a circular wave-guide, a conical horn section, and/or one or more ridges, fins, and/or corrugations.

A base plate 236 is formed at a bottom end of waveguide 216. The base plate partially occludes interior cavity 226, and is joined to three of wall portions 228. A plurality of apertures extend vertically through the base plate and are configured to receive fasteners, so that base plate 236 and antenna 210 may be fastened to another structure. The fastener apertures may be machined or drilled into base plate 236, and surfaces of the base plate may be precision finished by machining subsequent to additive manufacturing of antenna 210.

Figure 4:
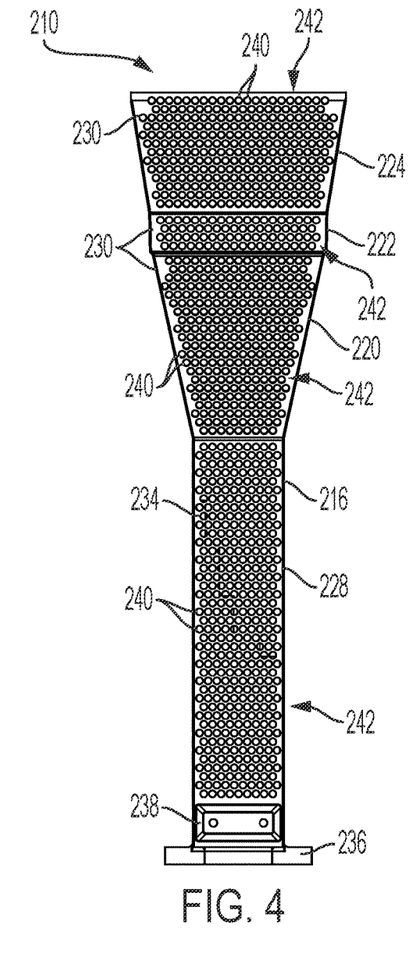
FIG. 4 is a front elevation view of the antenna of FIG. 3.
Figure 5:
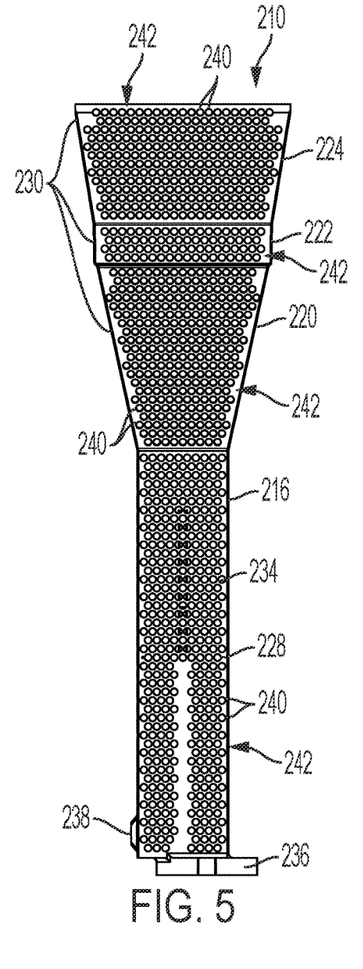
FIG. 5 is a side elevation view of the antenna of FIG. 3.

As shown in FIGS. 4 and 5, a feed interface portions (e.g. a feed interface adapter) 238 is formed on one of wall portions 228, proximate base plate 236 at the bottom end of waveguide 216. The interface portion includes a raised rectangular boss with an aperture extending horizontally through the feed interface portion and wall portion 228 at each end of the boss. The boss and apertures may be configured for connection of coaxial feeds and/or any appropriate antenna feeds. The connector apertures may be machined or drilled into feed interface portion 238, and surfaces of the feed interface portion may be precision finished by machining subsequent to additive manufacturing of antenna 210.

In some examples, command horn antenna 210 may be configured for connection to other supports or electronic components. Base plate 236 and/or feed interface portion 238 may include any appropriate connection features. In some examples, apertures in the base plate and/or feed interface portion may be created as part of the additive manufacturing process. In such examples, the apertures may have a diamond or other self-supporting shape rather than a circular shape.

Antenna 210 includes a plurality of holes 240, which extend through wall portions 228, 230. Holes 240 may also be described as mesh through holes. Each wall portion 228, 230 includes an array 242 of holes 240. Each array of holes is a regular arrangement of holes in a pattern appropriate to a shape and structural functionality of the respective wall portion. Holes 240 are examples of holes 124, and arrays 242 are examples of plurality of holes 114, as described above.

As shown more clearly in FIGS. 4 and 5, in the present example arrays 242 each comprise a series of regularly spaced rows, alternately offset such that each hole 240 aligns with a gap between holes in the two adjoining rows. Such rows may allow a desired density of holes. In the present example holes 240 account for approximately 60 percent of the surface area of wall portions 228, 230. An appropriate pattern for a desired density may depend on a shape of hole 240, as discussed further with reference to FIG. 7, below.

Holes 240 of each array 242 are spaced from edges of the respective wall portion, which may improve structural strength at the corners where wall portions meet. Holes 240 and/or arrays 242 may also be spaced from and/or altered to avoid other joins. For example, as shown in FIG. 5, array 242 of wall portion 228 includes a gap where holes 240 are spaced from a join between the wall portion and internal septum 234.

Figure 6:
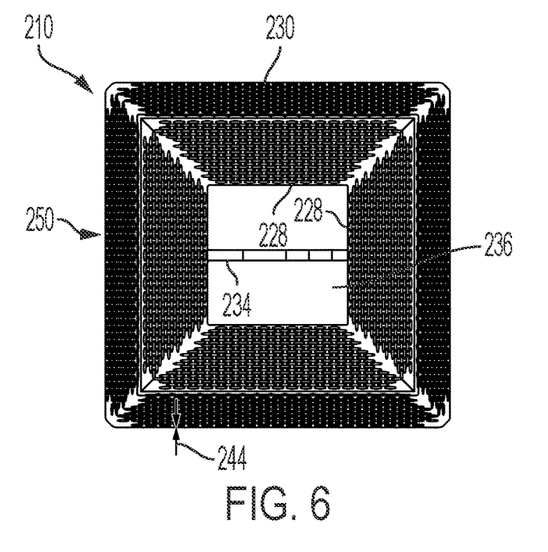
FIG. 6 is a top plan view of the antenna of FIG. 3.

As shown in FIG. 6, wall portions 228, 230 of antenna 210 all share a uniform thickness 244. In some examples, thickness 244 may vary between or within wall portions. Thickness 244, whether uniform or varied, may be equal to or greater than a minimum printable thickness throughout antenna 210. In other words, antenna 210 may be designed according to limitations associated with a selected additive manufacturing process and/or equipment such that the wall portions of the antenna are thick enough to be printable.

In the present example, thickness 244 of wall portions 228, 230 is approximately 0.035 inches (35 mil, or 0.09 cm). The conventional, traditionally manufactured horn antenna which antenna 210 is designed to replace may have a wall thickness of as little as approximately 0.15 inches (15 mil, or 0.04 cm). Thickness 244 of antenna 210 may be double, or more than double a corresponding thickness of the conventional antenna. However, due to holes 240 in the antenna walls, antenna 210 may not have double the mass of the conventional antenna.

Instead, antenna 210 has a mass below a maximum mass threshold. In other words, antenna 210 is designed such that mass increases due to increased wall thickness 244 are sufficiently balanced by mass decreases due to introduction of holes 240 to keep the mass of the antenna below a selected value. The value of the maximum mass threshold may be selected according to operational limitations, such as fuel capacity in a launch vehicle or material costs. In the present example, antenna 210 has a weight of approximately 0.15 pounds (2.4 ounces), and is designed to be below a selected maximum mass threshold of approximately 0.05 ounces per square inch. Antenna 210 has only approximately a 15 percent increased weight compared to the conventional antenna.

Figure 7:
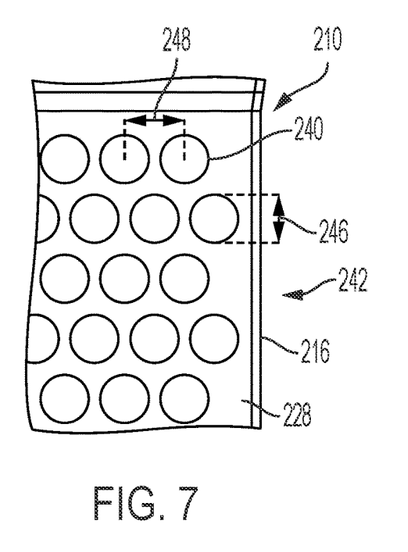
FIG. 7 is a detail view of some of the plurality of holes of the antenna of FIG. 3.

FIG. 7 shows a portion of an array 242 of holes 240 in a wall portion 228 of waveguide 216. In the present example, arrays 242 are similarly patterned and holes 240 are similarly sized and shaped throughout antenna 210, so the following description may be understood to apply equally to other arrays of holes. In some examples, the pattern of arrays 242 may vary and/or holes 240 may vary in size and/or shape between or within wall portions.

In the present example, holes 240 are circular and extend linearly through wall portion 228 to form an approximately cylindrical void in the wall portion. Each hole has a diameter 246, which is an example of maximum dimension 126 as described above. Holes 240 of array 242 are arranged in offset rows, as noted above. Each two adjacent holes in a row may be described as having a center-to-center spacing 248. That is, a center point of one hole is spaced from the center point of an adjacent hole by distance 248.

In the present example, diameter 246 of all holes 240 is approximately 0.08 inches (80 thousandths of an inch (mil), or 0.2 centimeters (cm)) and center-to-center spacing 248 for each pair of adjacent holes in a row is approximately 0.1 inches (100 mil, 0.25 cm). Therefore, adjacent holes are approximately 0.02 inches (20 mil, 0.05 cm) apart at a closest point. No two holes 240 are closer than 0.02 inches apart at any point.

Diameter 246 and spacing 248 may be selected according to printing limitations, structural considerations, and electromagnetic effect, as described above. The selection of size and shape of holes 240 may be interdependent. That is, the selected shape of the hole may determine printing limitations such as a maximum size printable without secondary supports.

In the depicted example, diameter 246 is small enough to allow holes 240 to be printed as circular without secondary supports, but large enough for the holes to be resolved by the selected DMLS printer. Holes 240 are also small enough to be electromagnetically opaque to an acceptable extent within an intended operating frequency range of antenna 210.

Antenna 210 is configured for radio communication within a frequency band. That is, the antenna is tuned to a range of radio frequencies. In the depicted example, antenna 210 is tuned to the X-band, which includes frequencies corresponding to a wavelength between approximately 3.75 and 2.5 cm. The maximum dimension, diameter 246, of holes 240 is no more than approximately 8 percent of the minimum expected wavelength. Therefore, holes 240 may have a negligible impact on the electromagnetic function and properties of antenna 210.

Shape of holes 240 and pattern of array 242 may be selected to achieve a desired density of holes. For an example in which holes 240 have a hexagonal shape, array 242 may have a honeycomb pattern. For another example, in which holes 240 have a square shape, array 242 may have a grid pattern. In some examples, holes 240 may be packed densely enough that wall portion 228 may be described as a mesh. In some examples, fewer holes may be needed and holes 240 may be spaced by a distance greater than a maximum hole dimension, e.g may be spaced apart by a distance greater than diameter 246.

B. Illustrative Method of Additive Manufacture

Figure 8:
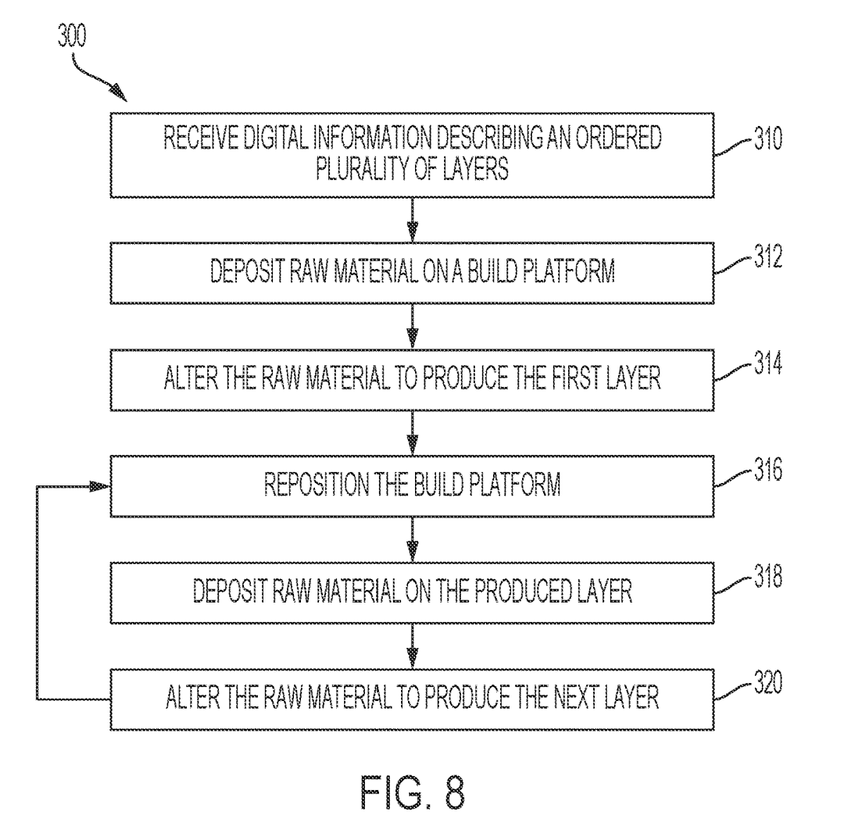
FIG. 8 is a flow chart depicting steps of an illustrative method of additive manufacture.

This section describes steps of an illustrative method 300 for additive manufacture of a workpiece; see FIG. 8. Aspects of an illustrative additive manufacturing device depicted in FIG. 9 may be utilized in the method steps described below. Where appropriate, reference may be made to components and systems that may be used in carrying out each step. These references are for illustration, and are not intended to limit the possible ways of carrying out any particular step of the method.

In some examples, method 300 may also be referred to as a method of 3-D printing. The terms additive manufacture and 3D printing may both be understood to include processes in which an object is created by adding material in successive layers. Additive manufacture may be understood as a broader term, encompassing 3D printing. In some examples, interchangeable usage of the terms additive manufacture and 3D printing may be appropriate. In the present disclosure, printing and/or a printing step may be understood to include creation by any method of additive manufacture. Examples of additive manufacturing processes include, but are not limited to, material extrusion, powder bed fusion, material jetting, binder jetting, directed energy deposition, vat photopolymerization, and sheet lamination.

FIG. 8 is a flowchart illustrating steps performed in an illustrative method, and may not recite the complete process or all steps of the method. Although various steps of method 300 are described below and depicted in FIG. 8, the steps need not necessarily all be performed, and in some cases may be performed simultaneously or in a different order than the order shown.

Figure 9:
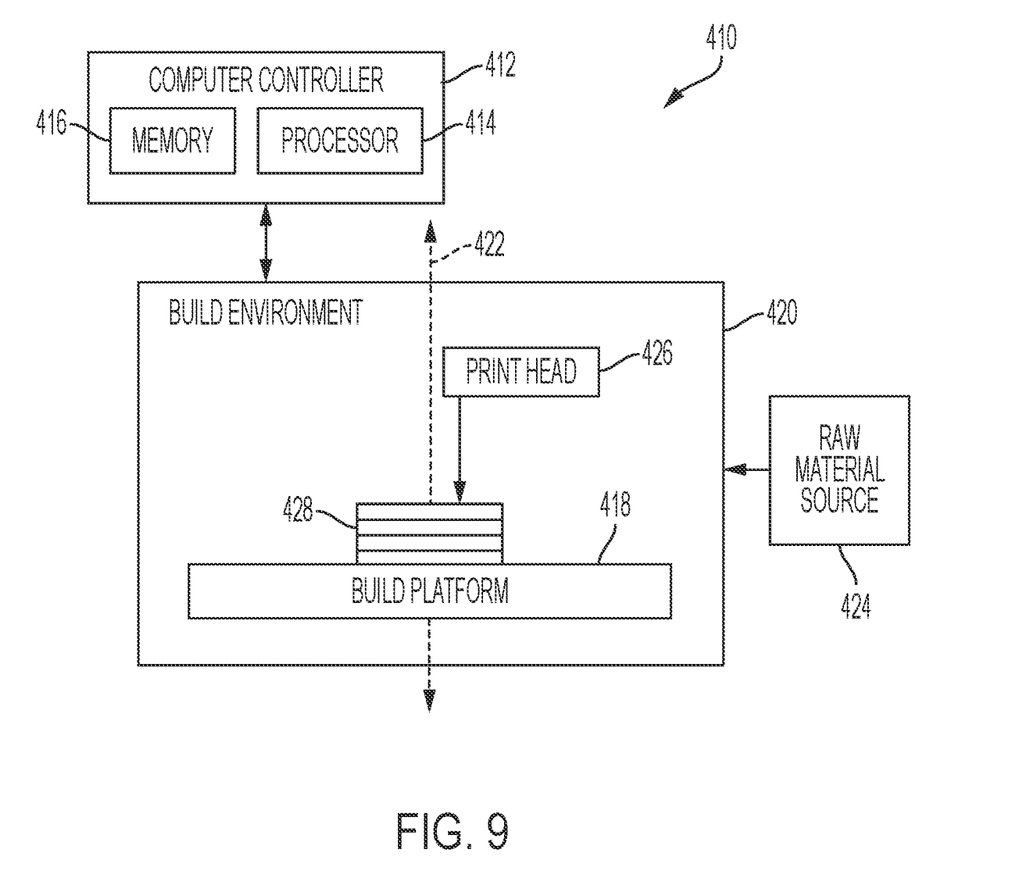
FIG. 9 is a schematic diagram of an illustrative additive manufacturing apparatus.

At step 310, digital information describing an ordered plurality of layers is received. The digital information may be received by a computer controller 412 of an additive manufacturing device 410 as depicted in FIG. 9. The additive manufacturing device may also be referred to as a printer, or a fabricator. Computer controller 412 may comprise any data processing system configured to receive digital design information and control functions of printer 410. The illustrative computer controller shown in FIG. 9 includes a processor 414 for controlling printer functions and memory 416 for storing received data.

The received information may include geometric data and/or design details for a plurality of two-dimensional patterns that constitute layers of a three-dimensional object, where the three-dimensional object is a workpiece 428 to be manufactured. The layers may also be described as cross-sections or slices. The plurality of layers is ordered, such that the layers may be numbered or organized from a first layer to a last layer.

Step 312 of method 300 includes depositing raw material on a build platform 418 located in a building environment 420 of printer 410. The build platform may comprise a support moveable by computer controller 412 along a manufacturing axis 422. The build platform may have a planar surface perpendicular to manufacturing axis 422.

The raw material may be any material appropriate to additive manufacturing, typically a fluid or powder and including but not limited to photopolymer resin, thermoplastic, plaster, ceramic, and metal. The material may be distributed from a raw material source 424 such as a hopper, a tank, or a powder bed. For example, aluminum powder may be swept from a powder bed over build platform 418 by a brush arm actuated by computer controller 412.

The raw material may be distributed evenly over build platform 418, or may be deposited in a selected pattern. Depositing may be done under control of computer controller 412. In some examples, build platform 418 may be submerged in raw material and depositing may be accomplished by gravity or fluid pressure. In some examples, a print head 426 connected to raw material source 424 may deposit the raw material in a pattern corresponding to the first layer of the ordered plurality of layers.

At step 314, the raw material is altered to produce the first layer. In other words, a physical change is induced the deposited material, according to the design information describing the first layer of the ordered plurality of layers and as directed by the computer controller 412, to realize the first layer as a physical object on the build platform.

The material may be acted on by a print head 426 of printer 410, controlled by computer controller 412. For example, the print head may include a laser that cures a photopolymer by exposure to light or sinters a metal powder by exposure to heat. The print head may be directed by computer controller 412 to follow a path delineated in the received digital information for the first layer, and/or a path calculated by processor 414 based on the received digital information.

Step 316 includes repositioning the build platform. In some examples, build platform 418 may start a selected distance from print head 426. The selected distance may be determined by the procedures performed by the print head. Subsequent to production of a layer, the build platform may be repositioned by computer controller 412 along manufacturing axis 422 away from print head 426 by the layer's thickness. That is, the build platform may be moved such that a top surface of the produced layer is the selected distance from print head 426.

In some examples, build platform 418 may start in alignment with another element of printer 410 such as a raw material distribution component. Subsequent to production of a layer, the build platform may be repositioned by computer controller 412 along manufacturing axis 422 such that a top surface of the produced layer is aligned with the other element of printer 410. In some examples, at step 316 print head 426 may be repositioned instead of or in addition to build platform 418. In some examples, step 316 may be skipped.

At step 318, raw material is deposited on the layer produced in the preceding step of method 300. As described for step 312, the raw material may be any appropriate material and may be deposited in any appropriate manner. At step 320, the raw material is altered to produce the next layer as previously described for step 314.

Steps 316 through 320 may be repeated to produce each layer of the plurality of layers of the received digital information, until the last layer is produced. The produced first through last layers may then comprise workpiece 428 as described in the received digital information. The workpiece may be removed from the printer and post-processed as desired. For example, the workpiece may be machined from a build plate of the build platform, and then fine details or smooth surfaces may be further finished by machining or other methods.

Workpiece 428 manufactured according to method 300 may possess different structural properties as compared to a workpiece manufactured according to traditional manufacturing methods such as machining, molding, and/or assembly. For example, all parts and/or features of workpiece 428 may be integral and/or monolithic. For another example, workpiece 428 may comprise a plurality of fused layers of material, where each layer is perpendicular to a build axis of the workpiece. For another example, workpiece 428 may include microstructural anisotropy resulting from the directionality of the manufacturing process.

C. Illustrative Method

Figure 10:
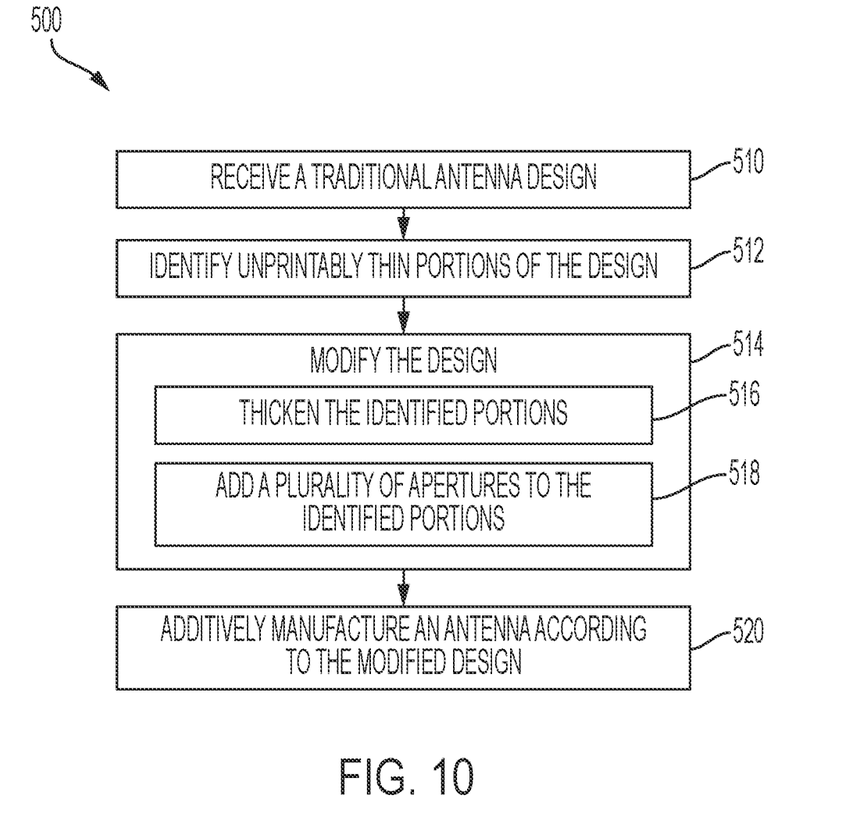
FIG. 10 is a flow chart depicting steps of an illustrative method for manufacturing an antenna, according to the present teachings.

This section describes steps of an illustrative method 500 for manufacturing an antenna; see FIG. 10. Aspects of antenna devices, manufacturing methods, and/or additive manufacturing apparatus described above may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 500 are described below and depicted in FIG. 10, the steps need not necessarily all be performed, and in some cases may be performed simultaneously or in a different order than the order shown.

At step 510, the method includes receiving a traditional antenna design. The design may be for any type of antenna configured to send and/or receive electromagnetic signals, for instance a command horn, cup dipole, or waveguide antenna. The traditional antenna design may also be described as a design for conventional manufacture of an antenna, and may include multiple subtractively manufactured components such as machined parts to be assembled by fastening, welding, bonding and/or other means.

Step 512 of the method includes identifying unprintably thin portions of the design. A desired additive manufacturing method and equipment may be selected, and relevant printing limitations for desired build quality may be assessed. Any effective additive manufacturing method and/or equipment may be selected, such as the illustrative method and additive manufacturing device described in Example B. A threshold thickness may be selected, below which printing is unachievable and/or results in undesirable build quality. Portions of the antenna design which are thinner than the selected threshold thickness may be identified as unprintably thin.

In some examples, the selected thickness may be dependent on orientation. For example, for a DMLS printer configured to deposit layers of approximately 30 micrometers, a thickness of 0.03 inches (30 mil, or 0.075 cm) or less as measured perpendicular to a build axis may be unprintably thin, while 0.02 inches (20 mil, or 0.05 cm) or less as measured parallel to the build axis may be unprintably thin. Portions of the antenna design may be evaluated for thickness according to an orientation relative to a selected build orientation or build axis. In some examples, other factors may be considered in identification of unprintably thin portions, such as unique limitations of selected printing equipment or materials.

Step 514 of the method includes modifying the received traditional antenna design for additive manufacture. Sub-step 516 of step 514 includes thickening the identified portions. In other words, for each identified unprintably thin portion of the traditional antenna design, the design may be modified such that the thickness of the identified portion is greater than or equal to the selected threshold thickness. The thickness may be uniformly increased throughout the portion and/or throughout all of the identified portions, and/or a new, printable thickness profile may be designed for each portion according to additive manufacturing design best practices. The new printable thickness profile may vary as the selected threshold thickness varies, may vary according to structural needs of the antenna design, and/or may vary in any appropriate manner.

Sub-step 518 of step 514 includes adding a plurality of holes to the identified portions. In some examples, a plurality of holes may additionally or alternatively be added to other portions of the antenna design, not identified in step 512 or thickened in sub-step 518. The plurality of holes may be configured to reduce the mass of the antenna, below a maximum mass threshold. For example, the mass of the antenna design may be reduced to below 120% of the mass of the original traditional antenna design, below an acceptable materials cost, and/or below an allowed launch weight. Size, number, and/or spacing of the holes may selected to provide sufficient mass reduction.

The modified antenna design may include a single continuous array of holes, multiple discrete arrays, and/or any effective groupings of holes. The holes may be uniform and identical, or may vary in size and/or shape. The holes may also be described as openings, holes, and/or voids, and/or the material between the holes may be described as forming a mesh.

The added holes may be sized and/or shaped to allow additive manufacture without use of secondary supports. For example, the holes may be sufficiently small to allow printing without buckling. For another example, the holes may have a self-supporting shape and orientation, such as a diamond having sides at an angle of no more than 45 degrees relative to the build axis. A maximum dimension and a minimum dimension of each hole may each be limited by manufacturability according to the selected additive manufacturing method and/or equipment.

The maximum dimension of each hole may also be limited relative to a smallest expected wavelength in the intended operational range of the antenna. That is, the antenna design may be configured for transmission and/or receipt of signals within a range of wavelengths, which may be referred to as an operating frequency band. Limiting the size of the holes may ensure that the holes have a negligible impact on the electromagnetic properties of the antenna. The holes may be described as electromagnetically opaque to the intended operating frequency range of the antenna.

The plurality of holes may also be sized, spaced and/or positioned according to structural requirements of the antenna design. That is, the holes may be added such that antenna design retains sufficient structural strength, stiffness, and/or other desired structural properties. For example, the holes may be spaced from joints, corners, and/or key structural features. For another example, the holes may comprise less than a selected percentage of the surface area of the antenna design.

In addition to sub-steps 516 and 518, step 514 may include any design changes appropriate to efficient and robust additive manufacture of an antenna. For example, separate parts of the design may be combined into a single monolithic unit. For another example, corners, joints, and sharp edges may be chamfered and/or radiused. For another example, lattice structures and/or supporting buttresses may be introduced. For another example, solid components may be replaced by a shell surrounding a honeycomb structure. In general, the design may be modified to avoid need for secondary support structures, prevent warping or cracking, and improve adherence to design specifications.

Step 520 of method 500 includes additively manufacturing an antenna according to the modified design. Step 520 may be performed according to the additive manufacturing method and/or on the additive manufacturing equipment selected in steps 512, 514 to inform identification of unprintably thin portions and design modifications. Step 520 may be repeated as needed to quickly and cost-effectively produce antennas with equivalent electromagnetic functionality as an antenna conventionally manufactured according to the traditional antenna design, and with limited to no mass and/or weight penalty.

Illustrative Combinations and Additional Examples

This section describes additional aspects and features of antenna devices and method of antenna device manufacture, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. An antenna device, comprising:
an additively manufactured tubular body configured to transmit electromagnetic radiation in a selected operating frequency range, and to have a mass below a maximum mass threshold,
wherein the tubular body includes a wall portion having a plurality of holes reducing the actual mass of the tubular body to below the maximum mass threshold without significantly adversely affecting electromagnetic radiation transmission capability of the tubular body in the selected operating frequency range.

A1. The antenna device of A0, wherein the selected operating frequency range includes radio waves.

A2. The antenna device of A0 or A1, wherein the wall portion has a thickness of at least 5 mils.

A3. The antenna device of any of A0-A2, wherein the wall portion has a thickness of at least 30 mils.

A4. The antenna device of any of A0-A3, wherein each hole of the plurality of holes is small enough to allow printing of the wall portion without secondary support.

A5. The antenna device of any of A0-A4, wherein each hole has a maximum dimension of less than 100 mils.

A6. The antenna device of any of A0-A5, wherein each hole has a center, the centers of adjacent holes being spaced by a distance of less than 200 mils.

A7. The antenna device of any of A0-A6, wherein the tubular body is comprised of laser sintered aluminum.

A8. The antenna device of any of A0-A7, wherein each hole is circular.

A9. The antenna device of any of A0-A8, wherein the selected operating frequency range is between 8 and 40 Gigahertz.

A10. The antenna device of any of A0-A9, wherein the maximum mass threshold is 0.05 ounces per square inch of the wall portion.

A11. The antenna device of any of A0-A10, wherein the tubular body has a rectangular cross section.

A12. The antenna device of any of A0-A11, wherein the tubular body has four sides, each side including a wall portion having a plurality of holes reducing the actual mass of the tubular body to below the maximum mass threshold without significantly adversely affecting electromagnetic radiation transmission capability of the tubular body in the selected operating frequency range.

A13. The antenna device of any of A0-A12, wherein the plurality of holes is an array of holes.

B0. An antenna device, comprising:
an additively manufactured tubular body portion having a plurality of holes,
wherein the antenna device has an operating frequency range and the plurality of holes are sized and arranged such that the plurality of holes are effectively opaque in the operating frequency range.

B1. The antenna device of B0, wherein each hole is a circular hole through a wall of the tubular body portion.

B2. The antenna device of B1, wherein each hole has a diameter, and each diameter is no more than 200 mils and no less than 30 mils.

B3. The antenna device of any of B0-B2, wherein the plurality of holes form a regular array.

B4. The antenna device of any of B0-B3, further including a feed interface portion, wherein the tubular body portion and the feed interface portion are monolithic.

B5. The antenna device of any of B0-B4, wherein the tubular body portion is comprised of laser sintered aluminum alloy.

B6. The antenna device of any of B0-B5, wherein the tubular body portion is configured to direct radio frequency signals.

B7. The antenna device of any of B0-B6, wherein the operating frequency range is in the X-band, the Ku-band, or the Ka-band.

B8. The antenna device of any of B0-B7, wherein the antenna device is a horn antenna.

B9. The antenna device of any of B0-B8, wherein the plurality of holes are in a wall of the tubular body portion, a ratio of an area of the wall between the holes and an area of the holes being between one and two.

C0. A method of manufacturing an antenna, comprising:
receiving a design for a traditionally manufactured antenna,
identifying portions of the antenna design which are less than a minimum printable size of a selected additive manufacturing apparatus,
modifying the design, including increasing the size of the identified portions and inserting a plurality of holes, and
additively manufacturing an antenna according to the modified design.

C1. The method of C0, wherein the antenna design has an intended operating frequency range and the inserted plurality of holes are sized and arranged such that the plurality of holes will be effectively opaque in the operating frequency range.

C2. The method of C0 or C1, wherein the traditionally manufactured antenna has a first mass, the additively manufactured antenna has second mass, and the second mass is no more than twenty percent greater than the first mass.

Advantages, Features, and Benefits

The different examples of the antenna devices described herein provide several advantages over known solutions for designing and producing additively manufactured antennas. For example, illustrative examples described herein allow additive manufacture of a replacement for a traditionally manufactured antenna.

Additionally, and among other benefits, illustrative examples described herein allow use of an additive manufacturing apparatus having a minimum printable thickness for manufacture of an antenna below a mass limit.

Additionally, and among other benefits, illustrative examples described herein allow additive manufacture of holes without use of sacrificial material or secondary supports.

Additionally, and among other benefits, illustrative examples described herein allow consistently repeatable additive manufacture of a geometrically precise antenna device.

No known system or device can perform these functions, particularly under stringent mass restrictions. Thus, the illustrative examples described herein are particularly useful for satellite communications antennas and other space-deployed antennas. However, not all examples described herein provide the same advantages or the same degree of advantage.

Conclusion

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An antenna device, comprising:
   an additively manufactured tubular body configured to transmit electromagnetic radiation in a selected operating frequency range, and including a wall portion having a plurality of circular holes,
   wherein each hole of the plurality of circular holes extends through the wall portion from a first side to a second side, and a diameter of the hole varies between the first side and the second side,
   wherein a minimum of the diameter of each hole is sufficiently small that the plurality of holes are effectively opaque in the operating frequency range.

2. The antenna device of claim 1, wherein the wall portion has a thickness of at least 30 mils.

3. The antenna device of claim 1, wherein each hole of the plurality of holes is small enough to allow printing of the wall portion without secondary support.

4. The antenna device of claim 1, wherein each hole has a minimum diameter of less than 100 mils, and the selected operating frequency range is between 8 and 40 Gigahertz.

5. The antenna device of claim 1, wherein each hole has a center, the centers of adjacent holes being spaced by a distance of less than 200 mils.

6. The antenna device of claim 1, wherein the tubular body is comprised of laser sintered aluminum.

7. The antenna device of claim 1, wherein the tubular body has a rectangular cross section.

8. A horn antennae, comprising:
   tubular body portion including a plurality of planar wall portions, each wall portion having a plurality of holes, the plurality of wall portions forming a rectangular wavequide portion and a pyramidal horn portion,
   a stepped septum extending between two opposing wall portions of the plurality of wall portions in an internal cavity of the wavequide portion, and
   a base plate at a bottom end of the wavequide portion, partially occluding the internal cavity of the wavequide portion, and joined to three of the plurality of wall portions,
   wherein the tubular body portion, the septum, and the base plate form a single monolithic unit, and
   wherein the horn antenna has an operating frequency range and the holes of each plurality of holes are sized and arranged such that the pluralities of holes are effectively opaque in the operating frequency range.

9. The horn antennae of claim 8, wherein each hole is a circular hole through a wall portion of the tubular body portion.

10. The horn antenna of claim 9, wherein each hole has a diameter, and each diameter is no more than 200 mils and no less than 30 mils.

11. The horn antenna of claim 8, wherein the plurality of holes form a regular array.

12. The horn antenna of claim 8, further including a feed interface portion, wherein the tubular body portion and the feed interface portion are monolithic.

13. The horn antenna of claim 8, wherein the tubular body portion is configured to direct radio frequency signals.

14. The antenna device of claim 1, wherein each hole has a maximum diameter at the first side of the wall portion, and has the minimum diameter interior to the wall portion, the minimum diameter being smaller than the maximum diameter.

15. The antenna device of claim 14, wherein a cross-sectional shape of each hole is symmetrical.

16. The antenna device of claim 1, wherein the diameter of each hole of the plurality of circular holes varies smoothly from the first side to the second side of the wall portion.

17. The horn antenna of claim 8, wherein the single monolithic unit of the tubular body portion, the septum, and the base plate is configured for printing without secondary support.

18. The horn antenna of claim 8, wherein each wall portion has a uniform thickness of at least 30 mils, and every wall portion has the same thickness.

19. An antenna device, comprising:
   an additively manufactured tubular body portion including a plurality of planar wall portions, each wall portion having a regular array of circular holes through the wall portion, the plurality of wall portions forming a rectangular waveguide portion and a pyramidal horn portion,
   wherein:
      each array includes a series of regularly spaced rows, the rows being alternately offset,
      each hole has a center, the centers of every two adjacent holes in a row being spaced by the same distance of less than 200 mils,
      each hole has the same diameter, and the diameter is no more than 200 mils and no less than 30 mils,
      the holes of the arrays of holes account for approximately 60 percent of the surface area of the plurality of wall portions, and
      the antenna device has an operating frequency range and the holes are sized and arranged such that the arrays of holes are effectively opaque in the operating frequency range.

20. The antenna device of claim 19, wherein each hole has a diameter of no more than approximately 8 percent of a minimum expected wavelength of the operating frequency range.

* * * * *